US010472283B2

(12) United States Patent
Frunz et al.

(10) Patent No.: US 10,472,283 B2
(45) Date of Patent: Nov. 12, 2019

(54) USE OF COMB POLYMERS FOR CONTROLLING THE RHEOLOGY OF MINERAL BINDER COMPOSITIONS

(71) Applicant: SIKA TECHNOLOGY AG, Baar (CH)

(72) Inventors: Lukas Frunz, Dietlikon (CH); Loic Lorcet, Gournay en Bray (FR); Jörg Zimmermann, Winterthur (CH); Pierre Petriol, Rouen (FR); Julien Gueville, Beauvoir en Lyons (FR); Walter De Carvalho, Saint Illiers le bois (FR)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/952,629

(22) Filed: Apr. 13, 2018

(65) Prior Publication Data

US 2018/0282219 A1  Oct. 4, 2018

Related U.S. Application Data

(62) Division of application No. 14/784,319, filed as application No. PCT/EP2014/056943 on Apr. 7, 2014.

(30) Foreign Application Priority Data

Apr. 17, 2013  (EP) .................................. 13164078

(51) Int. Cl.
*C04B 28/28* (2006.01)
*C04B 28/02* (2006.01)
*C04B 24/26* (2006.01)
*C08F 220/28* (2006.01)
*C04B 103/00* (2006.01)
*C04B 103/40* (2006.01)
*C04B 111/00* (2006.01)

(52) U.S. Cl.
CPC .......... *C04B 28/28* (2013.01); *C04B 24/2658* (2013.01); *C04B 28/02* (2013.01); *C04B 2103/006* (2013.01); *C04B 2103/408* (2013.01); *C04B 2111/00103* (2013.01); *C08F 2220/286* (2013.01)

(58) Field of Classification Search
CPC ...... C04B 28/28; C04B 24/2658; C04B 28/02
See application file for complete search history.

(56) References Cited

U.S. PATENT DOCUMENTS

| 2004/0204517 A1 | 10/2004 | Yamashita et al. |
| 2007/0039515 A1 | 2/2007 | Bandoh et al. |
| 2007/0163470 A1 | 7/2007 | Chanut et al. |
| 2008/0027177 A1 | 1/2008 | Nishikawa et al. |
| 2009/0137746 A1 | 5/2009 | Weinstein et al. |
| 2012/0095134 A1 | 4/2012 | Rinaldi et al. |
| 2013/0217808 A1 | 8/2013 | Sulser et al. |
| 2014/0080943 A1 | 3/2014 | Marchon et al. |

FOREIGN PATENT DOCUMENTS

| CN | 1768015 A | 5/2006 |
| CN | 1784369 A | 6/2006 |
| CN | 1802330 A | 7/2006 |
| CN | 1948210 A | 4/2007 |
| CN | 101445569 A | 6/2009 |
| EP | 1061089 A1 | 12/2000 |
| EP | 2 065 403 A1 | 6/2009 |
| EP | 2 463 314 A1 | 6/2012 |
| EP | 2 535 362 A1 | 12/2012 |
| JP | 2001011129 A | 1/2001 |
| JP | 2004-137130 A | 5/2004 |
| WO | 2009/044046 A2 | 4/2009 |
| WO | 2010029117 A2 | 3/2010 |
| WO | 2012/172040 A1 | 12/2012 |
| WO | 2013095134 A1 | 6/2013 |

OTHER PUBLICATIONS

Ran et al. Effect of the length of the side chains of comb-like copolymer dispersants on dispersion and rheological properties of concentrated cement suspensions. Journal of Colloid and Interface Science 336 (2009) 624-633. (Year: 2009).*
Jun. 21, 2018 Office Action issued in Russian Application No. 2015131998/03(049301).
Jun. 2, 2014 International Search Report issued in International Patent Application No. PCT/EP2014/056943.
Oct. 20, 2015 International Preliminary Report on Patentability issued in International Patent Application No. PCT/EP2014/056943.
Feb. 2, 2015 Office Action issued in Vietnamese Patent Application No. 1-2015-03616.
Nov. 19, 2015 Office Action issued in Columbian Patent Application No. 15-247060- -1.
Aug. 3, 2016 Office Action Issued in U.S. Appl. No. 14/784,319.
Oct. 28, 2016 Office Action issued in Chinese Patent Application No. 201480016264.4.
Mar. 15, 2017 Office Action issued in Australian Patent Application No. 2014255949.
Jul. 20, 2017 Office Action Issued in U.S. Appl. No. 14/784,319.
Ferrari et al. Influence of Carboxylic Acid-Carboxylic Ester Radio of Carboxylix Acid Ester Superplasticizer on Characteristics of Cement Mixtures. Special Publication, vol. 195, pp. 505-519. Jul. 1, 2000.
Jul. 12, 2017 Office Action issued in Chinese Application No. 201480016264.4.

(Continued)

*Primary Examiner* — John E Uselding
(74) *Attorney, Agent, or Firm* — Oliff PLC

(57) ABSTRACT

A comb polymer is used for increasing the flow rate and/or reducing the viscosity of a mineral binder composition, where the comb polymer has a main chain including acid groups and there are pendent chains linked to the main chain, and where the average number-average molar mass of all of the pendent chains is from 120 to 1000 g/mol and the molar ratio of the acid groups to the side chains is in the range from 0.5 to 2.

25 Claims, No Drawings

(56) References Cited

OTHER PUBLICATIONS

Jul. 14, 2017 Office Action issued in Columbian Patent Application No. 15-247060.
Jan. 17, 2018 Office Action issued in U.S. Appl. No. 14/784,319.
Jan. 15, 2018 Office Action issued in Russian Application No. 2015131998/03.
Jan. 30, 2018 Office Action issued in Chinese Patent Application No. 201480016264.4.
Jan. 16, 2018 Office Action issued in Japanese Application No. 2016-508083.
Bouzoubaa et al. Mechanical Properties and Durability of Concrete Made With High-Volume Fly Ash Blended Cements Using a Coarse Fly Ash. Cement and Concrete Research, vol. 31, No. 3, Oct. 2001, pp. 1393-1402. (Year: 2001).
Yazici et al. Effects of fly ash fineness on the mechanical properties of concrete. Sadhana vol. 37, Part 3, Jun. 2012, pp. 389-403. (Year: 2012).
Dec. 26, 2018 Office Action Issued in Indian Patent Application No. 2397/MUMNP/2015.
Jan. 8, 2019 Office Action Issued in Japanese Patent Application No. 2016-508083.

* cited by examiner

USE OF COMB POLYMERS FOR CONTROLLING THE RHEOLOGY OF MINERAL BINDER COMPOSITIONS

This is a Divisional of application Ser. No. 14/784,319 filed Oct. 14, 2015, which is a National Stage Application of PCT/EP2014/056943 filed Apr. 7, 2014 which claims the benefit of EP 13164078.1 filed on Apr. 17, 2013. The entire disclosures of the prior applications are hereby incorporated by reference herein their entireties.

TECHNICAL FIELD

The invention relates to the use of a comb polymer for increasing the flow rate and/or for reducing the viscosity of a mineral binder composition. A further aspect of the invention relates to a mineral binder composition and also to a cured molding comprising the comb polymer.

PRIOR ART

Dispersants or flow agents are used in the construction industry as plasticizers or water reducers for binder compositions, such as concrete, mortars, cements, plasters, and lime, for example. The dispersants are generally organic polymers, which are added to the mixing water or admixed in solid form to the binder compositions. As a result it is possible advantageously to modify not only the binder composition consistency during processing but also the properties in the cured state.

The selection and level of addition of a suitable dispersant are dependent in particular on the specific composition, the processing technology or the intended use of the binder composition. This is a demanding task particularly in the case of special binder compositions, such as specialty concretes or specialty mortars, for example.

The specialty concretes include, for example, what is called "self-compacting concrete" (SCC). Self-compacting concrete has a unique flow capacity and inherent compaction behavior. Accordingly, self-compacting concrete flows rapidly and without separation, purely on the basis of gravity, automatically fills cavities, and is deaerated without application of compaction energy. Vibrating as in the case of conventional concrete is therefore unnecessary. Self-compacting concrete is therefore particularly advantageous when high laying capacity is required, with demanding geometric shapes, with narrow-mesh reinforcement, with relatively thin components, or in situations where application of additional compaction energy is difficult or even impossible. In comparison to customary concrete, self-compacting concrete typically exhibits a modified grading curve and/or a higher level of fine-grain material.

With self-compacting concrete, optimum processing properties are achieved only if both the yield point or the slump flow and the viscosity or the flow rate of the concrete are each set within defined ranges at the same time. Otherwise there may easily be separation or demixing of the concrete constituents; inadequate flow behavior or stagnation may result, or unwanted air inclusions occur.

The selection of a suitable dispersant and the level of addition thereof in self-compacting concrete is therefore not trivial. Used customarily in the art are high-performance plasticizers in the form of polycarboxylate ethers.

In this context, WO 2009/044046 discloses, for example, dispersants based on polycarboxylate-based comb polymers which can be used among other things to reduce the viscosity of self-leveling binder compositions. These comb polymers have especially hydrophobic groups in the side chains.

Many of the known dispersants, however, are unable to provide complete satisfaction. On the one hand, known dispersants frequently influence both the slump flow and the flow rate of the mineral binder composition at the same time. A targeted increase in the flow rate of the mineral binder composition, without alteration to the yield point or the slump flow, is therefore almost impossible. Other dispersants call for special chemical groups or complicated chemical structures, which in turn complicates production and renders it expensive.

Consequently there continues to be a demand for improved dispersants, which do not have the disadvantages stated.

DESCRIPTION OF THE INVENTION

It is an object of the present invention, therefore, to provide a dispersant which permits a targeted increase in the flow rate and/or a reduction in the viscosity of mineral binder compositions. As far as possible, other properties of the mineral binder compositions, more particularly the slump flow or the yield point, are to remain unaltered. Preferably, moreover, the dispersant is to be suitable for use with other additives. The dispersant is intended in particular to be suitable for self-compacting concrete.

Surprisingly it has been found that the object is achieved by the features of independent claim 1.

The core of the invention lies in the use of a comb polymer for increasing the flow rate and/or for reducing the viscosity of a mineral binder composition, the comb polymer having a main chain comprising acid groups, and side chains being attached on the main chain, with the number-average molecular weight ($M_n$) of all side chains being 120-1000 g/mol, and with the molar ratio of the acid groups to the side chains being in the range of 0.5-2.

As has emerged, it is possible when using the comb polymers of the invention to obtain mineral binder compositions, in the form of self-compacting concrete, for example, with greatly improved fillability and flow rate. This is achievable without significant separation or demixing of the binder compositions, or air inclusions. Also surprising, in particular, is that the yield point of the binder compositions is substantially unaffected by the comb polymers used, in spite of the increase in the flow rate.

It has been found, moreover, that the comb polymers used in accordance with the invention are highly compatible with other additives, such as with further dispersants, for example.

Further aspects of the invention are subjects of further independent claims. Particularly preferred embodiments of the invention are subjects of the dependent claims.

Ways of Performing the Invention

A first aspect of the invention relates to the use of a comb polymer for increasing the flow rate and/or for reducing the viscosity of a mineral binder composition, the comb polymer having a main chain comprising acid groups, and side chains being attached on the main chain, with the number-average molecular weight ($M_n$) of all side chains being 120-1000 g/mol, and with a molar ratio of the acid groups to the side chains being in the range of 0.5-2.

Contemplated presently as a measure of the flow rate is the $t_{500}$ time according to DIN EN 12350-8:2010-12 ("Testing of fresh concrete—Part 8: Self-compacting concrete—Slump flow test"). The $t_{500}$ time is essentially the time in which the mixed or processable mineral binder composition attains a slump flow of 500 mm (diameter). The shorter the $t_{500}$ time, the greater the flow rate.

In accordance with DIN EN 12350-8:2010-12, moreover, the flow rate is a measure of the viscosity. The shorter the $t_{500}$ time, the higher the flow rate and the lower the viscosity of the mineral binder composition.

When the comb polymer is used in accordance with the invention, a mineral binder composition mixed up with water exhibits an increased flow rate and/or lower viscosity. This means that, following addition of the comb polymer of the invention, the composition flows more quickly or has a lower viscosity in comparison with an analogous composition which, however, does not contain the comb polymer, or in comparison with an analogous composition which comprises a comb polymer not of the invention.

In the case of the inventive use and of a level of addition of 1 wt %, based on the binder content, the comb polymer preferably influences the yield point and/or the slump flow of the mineral binder composition, measured according to DIN EN 12350-8:2010-12, by less than 15%, more particularly less than 10%, preferably less than 5%, especially less than 2% or less than 1%. This means that the slump flow and/or the yield point of the mineral binder composition, following addition of 1 wt % of the comb polymer of the invention, deviates by less than 15%, more particularly less than 10%, preferably less than 5%, especially less than 2% or less than 1%, from the slump flow of an analogous composition which does not contain the comb polymer of the invention.

In accordance with the invention the number-average molecular weight ($M_n$) of the side chains is 120-1000 g/mol. In this context it is possible for there to be not only side chains having a molecular weight in the range of 120-1000 g/mol but also side chains having a molecular weight of less than 120 g/mol and/or more than 1000 g/mol. On average, however, the number-average molecular weight ($M_n$) of all side chains is always in the range of 120-1000 g/mol.

According to one advantageous embodiment, the maximum number-average molecular weight of the side chains is less than 1000 g/mol. In this case there are no side chains having a number-average molecular weight above 1000 g/mol.

Preferably the number-average molecular weight ($M_n$) of the side chains is in the range of 160-900 g/mol, preferably 250-800 g/mol, more particularly 300-750 g/mol, especially 400-600 g/mol or 450-550 g/mol. In that case an optimum increase in the flow rate is achieved and at the same time the effect on the slump flow is minimized.

For specific applications, however, other molecular weights may also be suitable.

The weight-average molecular weight ($M_w$) and the number-average molecular weight ($M_n$) are determined presently by gel permeation chromatography (GPC) using polyethylene glycol (PEG) as a standard. This technique is known per se to the person skilled in the art.

The molar ratio of the acid groups to the side chains is in particular in the range of 0.75-1.7, especially 0.8-1.6, more particularly 0.85-1.5 or 0.9-1.2.

With advantage, the side chains are bonded to the main chain via ester, amide and/or imide groups. Ester, ether and/or amide groups are preferred, especially ester and/or ether groups.

More particularly the side chains comprise polyalkylene oxide side chains. With preference at least 50 mol %, more particularly at least 75 mol %, preferably at least 95 mol %, especially at least 98 mol % or 100 mol % of the side chains consist of polyalkylene oxide side chains.

A fraction of ethylene oxide units in the polyalkylene oxide side chains, based on all alkylene oxide units present in the side chains, is preferably more than 90 mol %, more particularly more than 95 mol %, preferably more than 98 mol %, especially 100 mol %.

In particular the polyalkylene oxide side chains have no hydrophobic groups, more particularly no alkylene oxides having three or more carbon atoms.

A high fraction of ethylene oxide units or a low level of alkylene oxides having three or more carbon atoms reduces the risk of unwanted air entrainment.

The polyalkylene oxide side chains have, in particular, a structure in accordance with formula $-[AO]_n-R^a$. In this formula, in particular, A is $C_2$ to $C_4$ alkylene. $R^a$ is preferably H or a $C_1$ to $C_{20}$ alkyl, cyclohexyl or alkylaryl group. Advantageously n is 2-250.

The term "acid groups" presently encompasses, in particular, carboxyl groups, sulfonic acid groups, phosphoric acid groups and/or phosphonic acid groups. The acid groups may each be in protonated form, in deprotonated form, for example as anion, and/or in the form of a salt with a counterion or cation. Consequently, for example, the acid groups may be in partially or fully neutralized form.

The acid groups in particular have a structure according to formula $-COOM$, $-SO_2-OM$, $-O-PO(OM)_2$ and/or $-PO(OM)_2$. Very preferably the acid groups have a structure according to the formula $-COOM$. Each M here, independently of the others, is H, an alkali metal ion, an alkaline earth metal ion, a di- or trivalent metal ion, an ammonium ion or an organic ammonium group.

If M is an organic ammonium group, it derives in particular from alkylamines or from C-hydroxylated amines, more particularly from hydroxyalkylamines, such as ethanolamine, diethanolamine or triethanolamine, for example.

A weight-average molecular weight ($M_w$) of the comb polymer is more particularly 5000-150000 g/mol, preferably 10000-100000 g/mol. A number-average molecular weight ($M_n$) of the comb polymer is advantageously 3000-100000 g/mol, more particularly 8000-70000 g/mol.

The comb polymer preferably comprises or consists of the following structural subunits:

a) a mole fractions of a structural subunit S1 of the formula (I)

(I)

b) b mole fractions of a structural subunit S2 of the formula (II)

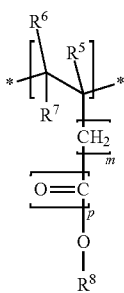

(II)

c) optionally c mole fractions of a structural subunit S3 of the formula (III)

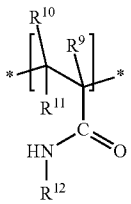

(III)

d) optionally d mole fractions of a structural subunit S4 of the formula (IV)

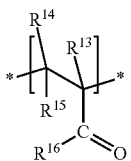

(IV)

where
- $R^1$, in each case independently of any other, is —COOM, —SO$_2$—OM, —O—PO(OM)$_2$ and/or —PO(OM)$_2$,
- $R^2$, $R^3$, $R^5$, $R^6$, $R^9$, $R^{10}$, $R^{13}$ and $R^{14}$, in each case independently of one another, are H or an alkyl group having 1 to 5 carbon atoms,
- $R^4$, $R^7$, $R^{11}$ and $R^{15}$, in each case independently of one another, are H, —COOM or an alkyl group having 1 to 5 carbon atoms,
- M, independently of any other, is H$^+$, an alkali metal ion, an alkaline earth metal ion, a di- or trivalent metal ion, an ammonium ion or an organic ammonium group,
- m is 0, 1 or 2,
- p is 0 or 1,
- $R^8$ and $R^{12}$, in each case independently of one another, are a C$_1$ to C$_{20}$ alkyl, cycloalkyl or alkylaryl group or are a group of the formula -[AO]$_n$—R$^a$,
  where A is C$_2$ to C$_4$ alkylene, R$^a$ is H, a C$_1$ to C$_{20}$ alkyl, cyclohexyl or alkylaryl group,
  and n is 2-250,
- $R^{16}$, independently of any other, is NH$_2$, —NR$^b$R$^c$ or —OR$^d$NR$^e$R$^f$,
  where R$^b$ and R$^c$, independently of one another, are a C$_1$ to C$_{20}$ alkyl, cycloalkyl, alkylaryl or aryl group, or are a hydroxyalkyl group or are an acetoxyethyl (CH$_3$—CO—O—CH$_2$—CH$_2$—) or a hydroxyisopropyl (HO—CH(CH$_3$)—CH$_2$—) or an acetoxyisopropyl (CH$_3$—CO—O—CH(CH$_3$)—CH$_2$—) group;

or R$^b$ and R$^c$ together form a ring of which the nitrogen is a part, in order to construct a morpholine or imidazoline ring;

R$^d$ is a C$_2$-C$_4$ alkylene group,

R$^e$ and R$^f$ each independently of one another are a C$_1$ to C$_{20}$ alkyl, cycloalkyl, alkylaryl or aryl group or a hydroxyalkyl group, and where a, b, c and d are mole fractions of the respective structural subunits S1, S2, S3, and S4, where a/b/c/d=(0.1-0.9)/(0.1-0.9)/(0-0.8)/(0-0.8), more particularly a/b/c/d=(0.3-0.7)/(0.2-0.7)/(0-0.6)/(0-0.4), preferably a/b/c/d=(0.4-0.7)/(0.3-0.6)/(0.001-0.005)/0, and with the proviso that a+b+c+d is 1.

The sequence of the structural subunits S1, S2, S3, and S4 may be alternating, blocklike or random. It is also possible, moreover, for there to be further structural subunits in addition to the structural subunits S1, S2, S3, and S4.

The structural subunits S1, S2, S3, and S4 together preferably have a weight fraction of at least 50 wt %, more particularly at least 90 wt %, very preferably at least 95 wt %, of the total weight of the comb polymer.

A ratio of a/(b+c+d)=is in particular in the range of 0.5-2, preferably 0.75-1.7, especially 0.8-1.6, more particularly 0.85-1.5 or 0.9-1.2.

In the comb polymer, in particular, $R^1$ is COOM, $R^2$ is H or CH$_3$, and $R^3$=$R^4$=H. The comb polymer can therefore be prepared on the basis of acrylic or methacrylic acid monomers, this being of advantage from an economic standpoint. With comb polymers of these kinds, moreover, an effective reduction in viscosity is produced in the present context.

Likewise advantageous are comb polymers where $R^1$=COOM, $R^2$=H, $R^3$=H, and $R^4$=COOM. Such comb polymers can be prepared on the basis of maleic acid monomers.

Advantageously, $R^5$ is H or CH$_3$ and $R^6$=$R^7$=H. Comb polymers of these kinds can be prepared, for example, starting from (meth)acrylic esters, vinyl ethers, (meth)allyl ethers or isoprenol ethers.

If S3 is present, then in particular $R^9$ is H or CH$_3$ and $R^{10}$=$R^{11}$=H.

If S4 is present, then in particular $R^{13}$ is H or CH$_3$ and $R^{14}$=$R^{15}$=H.

Very advantageously, $R^2$ and $R^5$ are mixtures of H and —CH$_3$. Preferred in that case are mixtures with 40-60 mol % H and 40-60 mol % —CH$_3$. If the corresponding structural subunits are present, this is also true, in particular, for $R^9$ and $R^{13}$. With preference, moreover, $R^3$ and $R^6$ are H, and also, if the corresponding structural subunits are present, $R^9$ and $R^{13}$ are H.

According to a further advantageous embodiment, $R^1$ is COOM, $R^2$=H, $R^5$=—CH$_3$, and $R^3$=$R^4$=$R^6$=$R^7$=H.

In the case of another advantageous embodiment, $R^1$ is COOM, $R^2$=$R^5$=H or —CH$_3$, and $R^3$=$R^4$=$R^6$=$R^7$=H.

In particular, $R^8$ and/or $R^{12}$ are -[AO]$_n$—R$^a$, and preferably A is C$_2$ alkylene and/or R$^a$ is H or a C$_1$ alkyl group. Advantageously, n is 2-30, more particularly n is 5-23, preferably n is 8-22, especially n is 10-15.

In particular, m is 0 and p is 1. Likewise advantageously, m is 1 or 2 and p is 0, and, in particular, $R^5$ is —CH$_3$.

For particularly preferred comb polymers:
a) $R^1$ is COOM;
b) $R^2$ and $R^5$, independently of one another, are H, —CH$_3$ or mixtures thereof. Very advantageously, $R^2$ and $R^5$ are mixtures of H and —CH₃. Preference in that case is given to mixtures with 40-60 mol % H and 40-60 mol % —CH₃. If structural subunits S3 and/or S4 are present, this is also true, in particular, for $R^9$ and $R^{13}$;

c) $R^3$ and $R^6$ are H. If structural subunits S3 and/or S4 are present, this is also true, in particular, for $R^{10}$ and/or $R^{14}$;

d) $R^4$ and $R^7$, independently of one another, are H or —COOM, preferably H. If structural subunits S3 and/or S4 are present, this is also true, in particular, for $R^{11}$ and $R^{15}$;

e) $R^8$ is -[AO]$_n$—$R^a$, and preferably A is $C_2$ alkylene and/or $R^a$ is H or a $C_1$ alkyl group. Advantageously n is 2-30, more particularly n is 5-23, preferably n is 8-22, especially n is 10-15. If structural subunit S3 is present, this is also true, in particular, for $R^{12}$;

f) m is 0 and p is 1.

The mineral binder composition is more particularly a processable and/or aqueous mineral binder composition.

The mineral binder composition comprises at least one mineral binder. The expression "mineral binder" refers more particularly to a binder which reacts in the presence of water, in a hydration reaction, to give solid hydrates or hydrate phases. This may be, for example, a hydraulic binder (e.g., cement or hydraulic lime), a latent hydraulic binder (e.g., slag), a pozzolanic binder (e.g., flyash), or a nonhydraulic binder (gypsum or white lime).

The mineral binder or the binder composition comprises more particularly a hydraulic binder, preferably cement. Particularly preferred is a cement with a cement clinker fraction of 35 wt %. In particular the cement is of type CEM I, CEM II and/or CEM III, CEM IV or CEM V (according to standard EN 197-1). A fraction of the hydraulic binder as a proportion of the overall mineral binder is advantageously at least 5 wt %, more particularly at least 20 wt %, preferably at least 35 wt %, especially at least 65 wt %. According to a further advantageous embodiment, the mineral binder consists to an extent of 95 wt % of hydraulic binder, more particularly of cement clinker.

It may, however, also be advantageous if the mineral binder or the mineral binder composition comprises or consists of other binders. These are, in particular, latent hydraulic binders and/or pozzolanic binders. Examples of suitable latent hydraulic and/or pozzolanic binders include slag, flyash and/or silica dust. The binder composition may also comprise inert materials such as, for example, limestone, finely ground quartzes and/or pigments. In one advantageous embodiment the mineral binder contains 5-95 wt %, more particularly 5-65 wt %, more preferably 15-35 wt % of latent hydraulic and/or pozzolanic binders. Advantageous latent hydraulic and/or pozzolanic binders are slag and/or flyash.

In one particularly preferred embodiment the mineral binder comprises a hydraulic binder, more particularly cement or cement clinker, and a latent hydraulic and/or pozzolanic binder, preferably slag and/or flyash. The fraction of the latent hydraulic and/or pozzolanic binder in this case is more preferably 5-65 wt, more preferably 15-35 wt %, while there is at least 35 wt %, especially at least 65 wt %, of the hydraulic binder.

The mineral binder composition is preferably a mortar composition or concrete composition, more particularly self-compacting concrete. The mineral binder composition is more particularly a mineral binder composition which is processable and/or is mixed with water.

A weight ratio of water to binder in the mineral binder composition is preferably in the range of 0.25-0.7, more particularly 0.26-0.65, preferably 0.27-0.60, especially 0.28-0.55.

The comb polymer is used advantageously with a fraction of 0.01-10 wt %, more particularly 0.1-7 wt % or 0.2-5 wt %, based on the binder content.

In particular, the mineral binder composition comprises fine-grain material, preferably with a fraction >350 kg/m³, more particularly 400-600 kg/m³. A cement content in this case is, in particular, between 320 and 380 kg/m³.

The fine-grain material comprises, in particular, flyash, metakaolin, silica dust and/or inert, finely ground rock.

In particular the fine-grain material is as fine as cement. In particular the maximum particle diameter of the fine-grain material, measured by laser granulometry, for example, is below 0.125 mm.

The fine-grain material preferably has a Blaine fineness of at least 1000 cm²/g, more particularly at least 1500 cm²/g, preferably at least 2500 cm²/g, more preferably still at least 3500 cm²/g or at least 5000 cm²/g.

In a further aspect, the invention relates to a composition, more particularly a mortar composition, a concrete composition or a cementitious composition comprising at least one comb polymer as described above and also a mineral binder. The mineral binder is preferably a hydraulic binder, more particularly cement, preferably Portland cement.

The composition is more particularly a self-compacting concrete composition.

The comb polymer advantageously possesses a fraction of 0.01-10 wt %, more particularly 0.1-7 wt % or 0.2-5 wt %, based on the binder content.

More particularly the composition comprises fine-grain material, preferably with a fraction >350 kg/m³, more particularly 400-600 kg/m³. The cement content in this case is, in particular, between 320 and 380 kg/m³.

A further aspect relates to a molding which is obtainable by curing a composition as described above, more particularly a self-compacting concrete, after addition of water.

The comb polymers used can be prepared in a conventional way.

A first process, also identified below as "polymer-analogous process", for preparing a comb polymer as described above comprises the following steps:

a) providing and/or preparing a base polymer BP comprising or consisting of a structural unit of the formula V

(V)

where

M, $R^1$, $R^2$, $R^3$, and $R^4$ are as defined above, with $R^1$ being more particularly —COOM, and m>2, more particularly m=20-100;

b) esterifying the base polymer BP with a compound of the formula VI

 (VI)

c) optionally amidating the base polymer BP with a compound of the formula VII

 (VII)

d) optionally amidating and/or esterifying the base polymer BP with a compound of the formula VIII $$H—R^{16} \qquad (VIII)$$

to give the comb polymer CP,
where $R^8$, $R^{12}$ and $R^{16}$ are as defined above.

The base polymer BP in step a) is, in particular, a polyacrylic acid, a polymethacrylic acid and/or a copolymer of acrylic acid and methacrylic acid. A number-average molecular weight ($M_n$) of the base polymer BP of the formula (V) is, in particular, 500-20000 g/mol, more particularly 500-10000 g/mol, more preferably 3000-6000 g/mol.

Base polymers BP of this kind can be prepared in a conventional way from acrylic acid monomers and/or methacrylic acid monomers. It is also possible, for example, to use maleic acid monomers and/or maleic anhydride monomers, however. This may be advantageous from standpoints including those of economy and safety.

The base polymer BP is prepared in step a), in particular by aqueous radical polymerization, of acrylic acid and/or methacrylic acid, for example, in the presence of a radical initiator and/or of a chain transfer agent.

The radical initiator in step a) comprises, in particular, Na—, K— or ammonium peroxodisulfate. Likewise suitable as radical initiator in step a) is, for example, a redox couple based on $H_2O_2/Fe^{2+}$.

The chain transfer agent in step a) is preferably an alkali metal sulfite or hydrogen sulfite. Likewise advantageous is a phosphinic acid derivative. The chain transfer agent in step a) may also be an organic compound which contains a thiol group.

Corresponding base polymers BP may in principle also be obtained commercially, from various suppliers.

Among the compounds which can be added for the esterification in step b) are acids and/or bases—as catalysts, for example. The esterification takes place advantageously at elevated temperatures of 120-200° C., more particularly 160-180° C. By this means it is possible to improve the yield significantly.

The compounds of the formulae V, VI and VII that are used in step b) are available commercially from various suppliers.

A second process, also identified below as "copolymerization process", for preparing a comb polymer as described above comprises a copolymerization of:

a mole fractions of monomers M1 of the formula IX

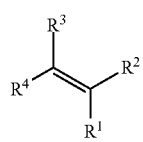

(IX)

b mole fractions of monomers M2 of the formula X

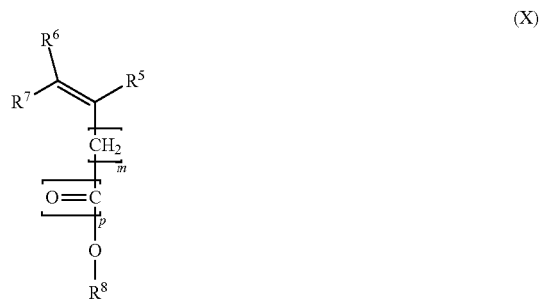

(X)

optionally c mole fractions of monomers M3 of the formula XI

(XI)

optionally d mole fractions of monomers M4 of the formula XII

(XII)

where a, b, c and d represent the mole fractions of the respective monomers M1, M2, M3, and M4,
where a, b, c, d, M, $R^1$-$R^{16}$, m, and p are as defined above.

The monomers M2, M3, and M4 may be prepared in a conventional way by esterification or amidation of acrylic acid, methacrylic acid, maleic acid and/or maleic anhydride with compounds of the formulae VI, VII or VIII (see above).

For the copolymerization or the second process it is possible to use the radical initiators and/or chain transfer agents already stated above in connection with the first process.

Working Examples

1. Measurement Methods

Molecular weight determinations were made by gel permeation chromatography (GPC) with aqueous eluents. A closely calibrated polyethylene glycol standard served for calibration. The eluent used was a 0.1 M sodium nitrate solution with a pH of 12, The isocratic flow rate was 0.8 ml/min. IGPC column: Varian Ultrahydrogel 7.8×300 mm. The peaks were quantified using a Varian RI-4 differential refractometer and a Waters SAT/IN module UV detector.

2. Materials Used

The starting materials used were as follows:
A polycarboxylic acid consisting of acrylic and methacrylic acid units (molar ratio 1:1) was used. The polycarboxylic acid was prepared by radical polymerization in accordance with known preparation protocols. The average molar mass of the polycarboxylic acid used is 5000 g/mol.

MPEG 500: Polyethylene glycol monomethyl ether with average molar mass 500 g/mol. Ethylene oxide (EO) content: ~11 EO groups/mole.

3. Preparation Example for Comb Polymer

Comb polymer CP-1, consisting of structural subunits S1, S2, and S3 in a molar ratio of approximately 0.5/0.5/0.002, prepared by polymer-analogous esterification of a polycarboxylic acid having a molar mass of about 5000 g/mol with MPEG 500. Degree of esterification: 50%, based on acid groups.

A 4-neck round bottom flask with a capacity of 2 liters, fitted with mechanical stirrer, thermometer, gas inlet tube, and distillation bridge, was charged with 340 g of an aqueous solution of the polycarboxylic acid (50 wt %). Subsequently, after heating had taken place to 50° C., 500 g of MPEG 500 were added rapidly and the mixture was heated to 165° C. over the course of 45 minutes under nitrogen, and maintained at 165° C. for 30 minutes. Thereafter 4 g of 50% strength aqueous sodium hydroxide solution were added and the temperature was then raised to 180° C., with simultaneous application of a reduced pressure of 80 mbar. This reaction solution was then maintained at 180° C. over the course of 4 hours, during which the internal pressure fell to 70 mbar.

After cooling had taken place to 90° C., 400 g of the melt were converted into a clear solution by being stirred into 400 g of water. Solids content: 49.9%

4. Fresh Concrete Tests 4.1 Production of a Reference Sample

A reference sample R1 was produced by dry-mixing Portland cement (CEM I, 42.5; 325 kg/m$^3$), slag (150 kg/m$^3$), Sikafume (25 kg/m$^3$), and aggregates (0-16 mm) in a mixer for 60 seconds. Then the mixing water (w/c=0.32), containing a conventional flow agent (2.5 wt %, based on binder content) in solution, was added, and the fresh concrete composition was mixed further mechanically for 3 minutes.

The conventional flow agent used is a polycarboxylate comb polymer with polyethylene glycol side chains. The weight-average molecular weight of the side chains is approximately 2000 g/mol, and the molar ratio of the acid groups to the side chains is approximately 4.4.

4.2 Production of a Fresh Concrete Sample with Comb Polymer CP-1

The sample P1 was produced in the same way as for the reference sample. In addition to the conventional flow agent, however, 1 wt % (based on binder content) of the comb polymer CP-1 was dissolved in the mixing water, and admixed to the fresh concrete composition.

4.3 Fresh Concrete Properties

The flow behavior of fresh concrete compositions without (sample R1) and with (sample P1) comb polymer CP-1 was determined in slump flow tests according to DIN EN 12350-8:2010-12 and also with a flow cup according to DIN EN 12350-9:2010-12, immediately after mixing had taken place.

Table 1 provides an overview of the results.

TABLE 1

| | Fresh concrete properties. | | | | |
|---|---|---|---|---|---|
| No. | Fraction of FA [wt %] | Fraction of CP-1 [wt %] | $t_{500}$ [s] | Slump flow [mm] | Flow time [s] |
| R1 | 2.5 | 0 | 21 | 720 | >60 |
| P1 | 2.5 | 1 | 14 | 720 | 35 |

From the $t_{500}$ times and the flow times listed in Table 1 it is apparent in particular that the further addition of the comb polymer CP-1 significantly reduces the viscosity of the fresh concrete compositions and increases the flow rate. This is achieved, moreover, without any effect on the slump flow or yield point.

It is therefore possible to use CP-1 in a targeted way to control the viscosity or flow rate.

The embodiments described above are to be understood, however, merely as illustrative examples, which may be modified in any desired way within the bounds of the invention.

The invention claimed is:

1. A process comprising:
    obtaining a comb polymer having:
        a main chain comprising acid groups, and side chains attached on the main chain, where a number-average molecular weight (Mn) of all side chains in a range of from 120-800 g/mol, and a molar ratio of the acid groups to the side chains in the range of from 0.5-1.7; and
    mixing the comb polymer, a mineral binder and water to form a mineral binder composition; wherein
        the comb polymer is mixed into the binder composition in an amount sufficient to increase the flow rate and/or reduce the viscosity of the mineral binder composition relative to an analogous mineral binder composition that does not contain the comb polymer but otherwise is identical with the mineral binder composition comprising the comb polymer, the amount of the comb polymer also being effective to keep the yield point and/or the slump flow of the binder composition from deviating by less than 2% from that of the analogous mineral binder composition, wherein the yield point, the slump flow, the flow rate and the viscosity are measured according to DIN EN 12350-8:2010-12.

2. A process comprising:
    obtaining a comb polymer having:
        a main chain comprising acid groups, and side chains attached on the main chain, where a number-average molecular weight (Mn) of all side chains in a range of from 120-800 g/mol, and a molar ratio of the acid groups to the side chains in the range of from 0.5-1.7; and
    mixing the comb polymer, a mineral binder and water to form a mineral binder composition; wherein
        the comb polymer is mixed into the binder composition in an amount sufficient to increase the flow rate and/or reduce the viscosity of the mineral binder composition relative to an analogous mineral binder composition that does not contain the comb polymer but otherwise is identical with the mineral binder composition comprising the comb polymer, the amount of the comb polymer also being effective to keep the yield point and/or the slump flow of the binder composition from deviating by less than 1% from that of the analogous mineral binder composition, wherein the yield point, the slump flow, the flow rate and the viscosity are measured according to DIN EN 12350-8:2010-12.

3. The process of claim 1, wherein the molar ratio of the acid groups to the side chains is in the range of from 0.75-1.7.

4. The process of claim 1, wherein the molar ratio of the acid groups to the side chains is in the range of from 0.85-1.5.

5. The process of claim 1, wherein the side chains are bonded to the main chain via ester, ether, amide and/or imide groups.

6. The process of claim 1, wherein the number-average molecular weight (Mn) of the side chains is in the range of 250-800 g/mol.

7. The process of claim 1, wherein at least 50 mol % of the side chains consist of polyalkylene oxide side chains.

8. The process of claim 7, wherein a fraction of ethylene oxide units in the polyalkylene oxide side chains, based on all alkylene oxide units present in the side chains, is more than 90 mol %.

9. The process of claim 1, wherein the side chains have no hydrophobic groups.

10. The process of claim 1, wherein the comb polymer comprises the following structural subunits:

a) a mole fractions of a structural subunit S1 of the formula (I)

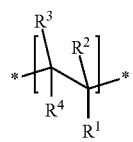

(I)

b) b mole fractions of a structural subunit S2 of the formula (II)

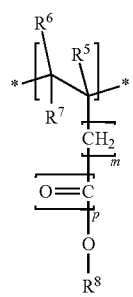

(II)

c) optionally c mole fractions of a structural subunit S3 of the formula (III)

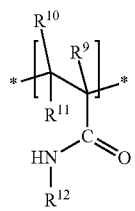

(III)

d) optionally d mole fractions of a structural subunit S4 of the formula (IV)

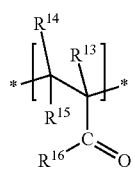

(IV)

where
$R^1$, in each case independently of any other,
is —COOM, —$SO_2$-OM, —O—PO(OM)$_2$ and/or —PO(OM)$_2$,
$R^2$, $R^3$, $R^5$, $R^6$, $R^9$, $R^{10}$, $R^{13}$ and $R^{14}$, in each case independently of one another, are H or an alkyl group having 1 to 5 carbon atoms,
$R^4$, $R^7$, $R^{11}$ and $R^{15}$, in each case independently of one another, are H, —COOM or an alkyl group having 1 to 5 carbon atoms,
M, independently of any other, is H$^+$, an alkali metal ion, an alkaline earth metal ion, a di- or trivalent metal ion, an ammonium ion or an organic ammonium group,
m is 0, 1 or 2,
p is 0 or 1,
$R^8$ and $R^{12}$, in each case independently of one another, are a $C_1$ to $C_{20}$ alkyl, cycloalkyl or alkylaryl group or are a group of the formula -[AO]$_n$—$R^a$,
where A is $C_2$ to $C_4$ alkylene, $R^a$ is H, a $C_1$ to $C_{20}$ alkyl, cyclohexyl or alkylaryl group,
and n is 2-250,
$R^{16}$, independently of any other, is NH$_2$, —NR$^b$R$^c$ or —OR$^d$NR$^e$R$^f$, where R$^b$ and R$^c$, independently of one another, are
a $C_1$ to $C_{20}$ alkyl, cycloalkyl, alkylaryl or aryl group, or are a hydroxyalkyl group or are an acetoxyethyl (CH$_3$—CO—O—CH$_2$—CH$_2$—) or a hydroxyisopropyl (HO—CH(CH$_3$)—CH$_2$—) or an acetoxyisopropyl (CH$_3$—CO—O—CH(CH$_3$)—CH$_2$—) group;
or R$^b$ and R$^c$ together form a ring of which the nitrogen is a part, in order to construct a morpholine or imidazoline ring;
R$^d$ is a $C_2$-$C_4$ alkylene group,
R$^e$ and R$^f$ each independently of one another are a $C_1$ to $C_{20}$ alkyl, cycloalkyl, alkylaryl or aryl group or a hydroxyalkyl group,
and where a, b, c and d are mole fractions of the respective structural subunits S1, S2, S3, and S4, where a/b/c/d= (0.1-0.9)/(0.1-0.9)/(0-0.8)/(0-0.8).

11. The process of claim 10, the comb polymer consists of the structural subunits S1, S2, S3, and S4.

12. The process of claim 10, wherein
$R^8$ is -[AO]$_n$—$R^a$,
A is $C_2$ alkylene,
$R^a$ is H or a $C_1$ alkyl group, and
n is 2-30.

13. The process of claim 10, wherein
m is 0,
p is 1, and
$R^2$ and $R^5$ are each mixtures of 40-60 mol % H and 40-60 mol % —$CH_3$.

14. The process of claim 1, wherein
the amount of the comb polymer is in a range of from 0.01-10 wt % based on the mineral binder content, and
a weight ratio of the water to the mineral binder in the mineral binder composition is in the range of 0.25-0.7.

15. The process of claim 1, wherein
the amount of the comb polymer is in a range of from 0.2-5 wt % based on the mineral binder content, and
a weight ratio of the water to the mineral binder in the mineral binder composition is in the range of 0.25-0.55.

16. The process of claim 1, wherein the mineral binder composition is a self-compacting concrete.

17. The process of claim 16, further comprising:
filling a cavity with the self-compacting concrete; and
curing the self-compacting concrete; wherein
the cavity is filled and the self-compacting concrete is cured without separation or demixing of the self-compacting concrete, and without air inclusions.

18. The process of claim 17, wherein
the self-compacting concrete further comprises cement and fine-grain material, and
the fine-grain material comprises flyash, metakaolin, silica dust and/or inert, finely ground rock.

19. The process of claim 18, wherein a content of the fine-grain material is greater than 350 kg/m$^3$.

20. The process of claim 18, wherein the fine-grain material has a Blaine fineness of at least 5000 cm$^2$/g.

21. The process of claim 1, wherein
the molar ratio of the acid groups to the side chains is in the range of from 0.50-1.6, and
the number-average molecular weight (Mn) of the side chains is in the range of 300-750 g/mol.

22. The process of claim 1, wherein
the molar ratio of the acid groups to the side chains is in the range of from 0.75-1.5, and
the number-average molecular weight (Mn) of the side chains is in the range of 400-600 g/mol.

23. The process of claim 1, wherein
the molar ratio of the acid groups to the side chains is in the range of from 0.85-1.5, and
the number-average molecular weight (Mn) of the side chains is in the range of 450-550 g/mol.

24. The process of claim 1, wherein
the molar ratio of the acid groups to the side chains is in the range of from 0.9-1.2, and
the number-average molecular weight (Mn) of the side chains is in the range of 450-550 g/mol.

25. The process of claim 1, wherein
the molar ratio of the acid groups to the side chains is in the range of from 0.9-1.2, and
the number-average molecular weight (Mn) of the side chains is in the range of 450-550 g/mol.

* * * * *